United States Patent
Hoffjann et al.

(10) Patent No.: US 7,208,239 B2
(45) Date of Patent: Apr. 24, 2007

(54) FUEL CELL SYSTEM AND METHOD WITH INCREASED EFFICIENCY AND REDUCED EXHAUST EMISSIONS

(75) Inventors: Claus Hoffjann, Hamburg (DE); Hans-Juergen Heinrich, Hamburg (DE)

(73) Assignee: Airbus Deutschland GmbH, Hamburg (DE)

( * ) Notice: Subject to any disclaimer, the term of this patent is extended or adjusted under 35 U.S.C. 154(b) by 567 days.

(21) Appl. No.: 10/414,418

(22) Filed: Apr. 14, 2003

(65) Prior Publication Data

US 2004/0043276 A1  Mar. 4, 2004

(30) Foreign Application Priority Data

Apr. 13, 2002 (DE) ............... 102 16 361

(51) Int. Cl.
*H01M 8/06* (2006.01)
*H01M 8/04* (2006.01)

(52) U.S. Cl. ............... 429/17; 429/19; 429/26; 429/32

(58) Field of Classification Search ............... None
See application file for complete search history.

(56) References Cited

U.S. PATENT DOCUMENTS 6,296,957 B1  10/2001 Graage
6,450,447 B1  9/2002 Konrad et al.
6,623,880 B1 * 9/2003 Geisbrecht et al. ........... 429/12
6,924,053 B2 * 8/2005 McElroy ................ 429/26
2002/0142198 A1 * 10/2002 Towler et al. ............... 429/17

FOREIGN PATENT DOCUMENTS

| DE | 19821952 | 11/1999 |
|---|---|---|
| DE | 19911018 | 8/2000 |
| EP | 0957026 | 11/1999 |
| EP | 1035016 | 9/2000 |
| GB | 2338750 | 12/1999 |

\* cited by examiner

*Primary Examiner*—Jonathan Crepeau
(74) *Attorney, Agent, or Firm*—W. F. Fasse; W. G. Fasse

(57) ABSTRACT

An apparatus includes a low temperature fuel cell, a high temperature fuel cell or a hydrocarbon reformer, a hydrocarbon fuel supply, an oxygen generator, and a molecular sieve. The oxygen generator separates air to provide oxygen enriched air to the fuel cells and the reformer. Hydrocarbon fuel is provided to the high temperature fuel cell or the reformer, and the exhaust gas thereof may be separated through the molecular sieve, to provide hydrogen enriched gas to the low temperature fuel cell, water, carbon monoxide, and carbon dioxide. The low temperature fuel cell outputs nitrogen gas and high purity water. The emitted carbon oxides and nitrogen oxides are catalytically converted to nitrogen and carbon dioxide being returned to the atmosphere. The process and apparatus are very efficient, produce high purity water and electrical energy, and are environmentally friendly.

37 Claims, 4 Drawing Sheets

FUEL CELL SYSTEM AND METHOD WITH INCREASED EFFICIENCY AND REDUCED EXHAUST EMISSIONS

PRIORITY CLAIM

This application is based on and claims the priority under 35 U.S.C. §119 of German Patent Application 102 16 361.8, filed on Apr. 13, 2002, the entire disclosure of which is incorporated herein by reference.

FIELD OF THE INVENTION

The invention relates to a method for increasing the efficiency and reducing the exhaust emissions of a fuel cell system, especially a system for generating energy and water from one or more fuel cells. The invention further relates to a fuel cell arrangement for carrying out such a method.

BACKGROUND INFORMATION

A fuel cell is an electrochemical cell that converts chemical energy directly into electrical energy through a chemical reaction between an electrolyte, a fuel, and an oxidizer. The use of fuel cells is becoming of ever-greater interest as a potentially cleaner and more efficient manner of producing electrical energy, in comparison to combustion-based power generation processes and systems. For operating a fuel cell, generally two gaseous raw materials or input materials are needed: namely hydrogen ($H_2$) supplied to the anode side of the fuel cell, and oxygen ($O_2$) supplied to the cathode side of the fuel cell. Depending on the fuel cell type, these gases can be supplied as pure gases in molecular form, or components of gas mixtures, or recovered from other chemical compounds through so-called reforming processes (for example hydrogen being obtained by reforming hydrocarbons provided in a fuel).

In various applications, for example in mobile applications such as in vehicles, the oxygen input proportion required by the fuel cell is recovered from the surrounding ambient environmental air, which is a mixed gas comprising approximately 18% oxygen ($O_2$), 78% nitrogen ($N_2$), and 4% other gases ($CO_2$ and trace gases). This means that only 18% of the total input gas is actually available for use in the fuel cell, while approximately 82% of the input gas supplied to the oxygen side of the fuel cell is not useable in the fuel cell reaction process. That necessarily leads to inefficiencies and undesired side effects in the process. In the case of high temperature fuel cells, which operate at temperatures in the range of about 600 to 1000° C., this further leads to undesired thermochemical reactions, such as the formation of nitrogen oxides ($NO_X$). Furthermore, when the hydrogen ($H_2$) needed for the fuel cell is to be recovered from a hydrocarbon fuel, such as a mineral oil, the pertinent reforming process will simultaneously generate gases that are not useable by the fuel cell and thus are emitted as exhaust gases ($CO$, $CO_2$, $C_XH_Y$). These undesired byproduct gases become pollutant components of the output exhaust gas.

In view of the above considerations, it is desirable and needed in the field of fuel cells, to increase the efficiency and reduce the exhaust emissions in the operation of the fuel cell.

German Patent Publication DE 198 21 952 C2 discloses an energy generating or supply unit onboard an aircraft, as a substitute for a main engine generator, a so-called auxiliary power unit (APU), a RAM air turbine (RAT), or a NiCd battery pack. The disclosed energy supply unit includes a fuel cell for generating an electrical direct current. The air needed by the fuel cell is provided by the exhaust air of the aircraft air conditioning plant or by external ambient air from outside the aircraft. Furthermore, water for the water supply of the aircraft is recovered from the fuel cell exhaust gases, and the remaining fuel cell exhaust gases are then emitted to the outside environment surrounding the aircraft. The hydrogen emitted by the fuel cell is also emitted to the ambient environment outside of the aircraft.

German Patent Publication DE 199 11 018 C1 discloses an auxiliary engine for an aircraft, and particularly a so-called auxiliary power unit (APU), which includes a gas turbine engine comprising a combustion chamber, a compressor, and a turbine. A work-output compressor coupled to the engine serves to generate compressed air for use onboard the aircraft. Additionally, the APU package further includes a fuel cell for generating electrical energy for use onboard the aircraft.

British Patent Publication GB 2,338,750 A discloses a jet engine with an integrated fuel cell. The fuel cell in this reference is used in a conventionally typical manner as generally discussed above. This reference, as well as the above mentioned references, do not disclose or suggest any reduction process by which the content of CO and/or $NO_X$ in the exhaust gas of a high temperature fuel cell can be reduced, or in which the hydrogen contained in the exhaust gas is further provided as a fuel to be utilized in a low temperature fuel cell. Thus, the above references have not addressed or suggested solutions to the problems to be addressed by the present invention.

Separately from any considerations regarding the structure or operation of fuel cell systems, it is generally known to use oxygen enrichment devices or oxygen generators to selectively separate an input flow of air into an output flow having an enriched oxygen content and an exhaust or byproduct flow having a reduced oxygen content. For example, in the context of aircraft systems, it is known to provide an oxygen enrichment device comprising a container with two molecular sieves arranged opposite each other therein. This device is operated by alternating the throughflow direction in this container, for enriching the oxygen content of an output gas flow, to be provided as an oxygen supply for the passengers of the aircraft, in a so-called OnBoard Oxygen Generating System (OBOGS). It is also known to use systems based on ceramic materials, and systems using the influence of electrostatic charges, for enriching the oxygen content of an output gas flow.

SUMMARY OF THE INVENTION

In view of the above, it is an object of the invention to provide a fuel cell arrangement and a method for increasing the efficiency of fuel cells operated with input air and hydrogen or hydrocarbon fuel, and to simultaneously reduce undesired exhaust gas emissions from the operation of the fuel cells. It is a further object of the invention to provide an improved fuel cell arrangement and operating method, which can very effectively and efficiently be used for generating electrical power as well as useable water onboard an aircraft. The invention further aims to avoid or overcome the disadvantages of the prior art, and to achieve additional advantages, as apparent from the present specification.

The above objects have been achieved according to the invention in an arrangement comprising a fuel cell system and an oxygen enrichment unit, also called an oxygen generator herein. The fuel cell system includes at least a low temperature fuel cell such as a PEM fuel cell (PEMFC, Proton Exchange Membrane Fuel Cell, also known as a Polymer Electrolyte Membrane Fuel Cell). The oxygen generator incorporates any devices and processes for producing an output gas with an enriched oxygen content from an input flow of environmental air. For example, the oxygen generator comprises a molecular sieve that is selectively permeable by oxygen. The oxygen generator may use porous ceramic, or devices using electrostatic charges for the selective separation or enrichment of the oxygen content of the air. The oxygen enriched gas is then provided to the fuel cell system together with an input fuel, such as hydrogen and/or a hydrocarbon fuel.

In addition to the low temperature fuel cell, the fuel cell system may further optionally include a high temperature fuel cell, e.g. a Solid Oxide Fuel Cell (SOFC). As a further alternative option, the fuel cell system includes the low temperature fuel cell and a reformer device that carries out a hydrocarbon reforming process on the input hydrocarbon fuel. Either the high temperature fuel cell or the reformer provides hydrogen in the output or exhaust thereof, which is then fed to the low temperature fuel cell as the required fuel.

The arrangement may further comprise a molecular sieve that receives the exhaust or output gases of the high temperature fuel cell or the reformer, and selectively separates hydrogen therefrom. This hydrogen or hydrogen enriched gas is then provided back to the fuel cell system, particularly to the low temperature fuel cell as the fuel for operating the low temperature fuel cell. Thus, the fully developed arrangement according to the invention includes oxygen enrichment for the oxidizer gas input of the fuel cell system, particularly the low temperature fuel cell and the high temperature fuel cell, by using the oxygen generator, as well as hydrogen enrichment of the fuel gas for the low temperature fuel cell by reprocessing the exhaust gases of the high temperature fuel cell through a molecular sieve to provide hydrogen or hydrogen enriched gas as a fuel to the low temperature fuel cell as well as useable water as a byproduct. Thereby, the efficiency of the system is increased, and the exhaust gas emissions are reduced.

The inventive method and system are thus based on the enrichment of the input gases that are useable by and provided to the fuel cell or cells, while simultaneously reducing all other gases that are not directly involved or utilized in the fuel cell processes, or correspondingly reducing or avoiding undesired thermochemical conversions and side-processes in the operation of the fuel cells. In this regard, the components and the method features of the invention can be separated into two major groups, namely the first group relating to the oxygen enrichment and the second group relating to the fuel enrichment.

BRIEF DESCRIPTION OF THE DRAWINGS

In order that the invention may be clearly understood, it will now be described in connection with example embodiments, with reference to the accompanying drawings, wherein.

DETAILED DESCRIPTION OF A PREFERRED EXAMPLE EMBODIMENT AND OF THE BEST MODE OF THE INVENTION

Figure 1:
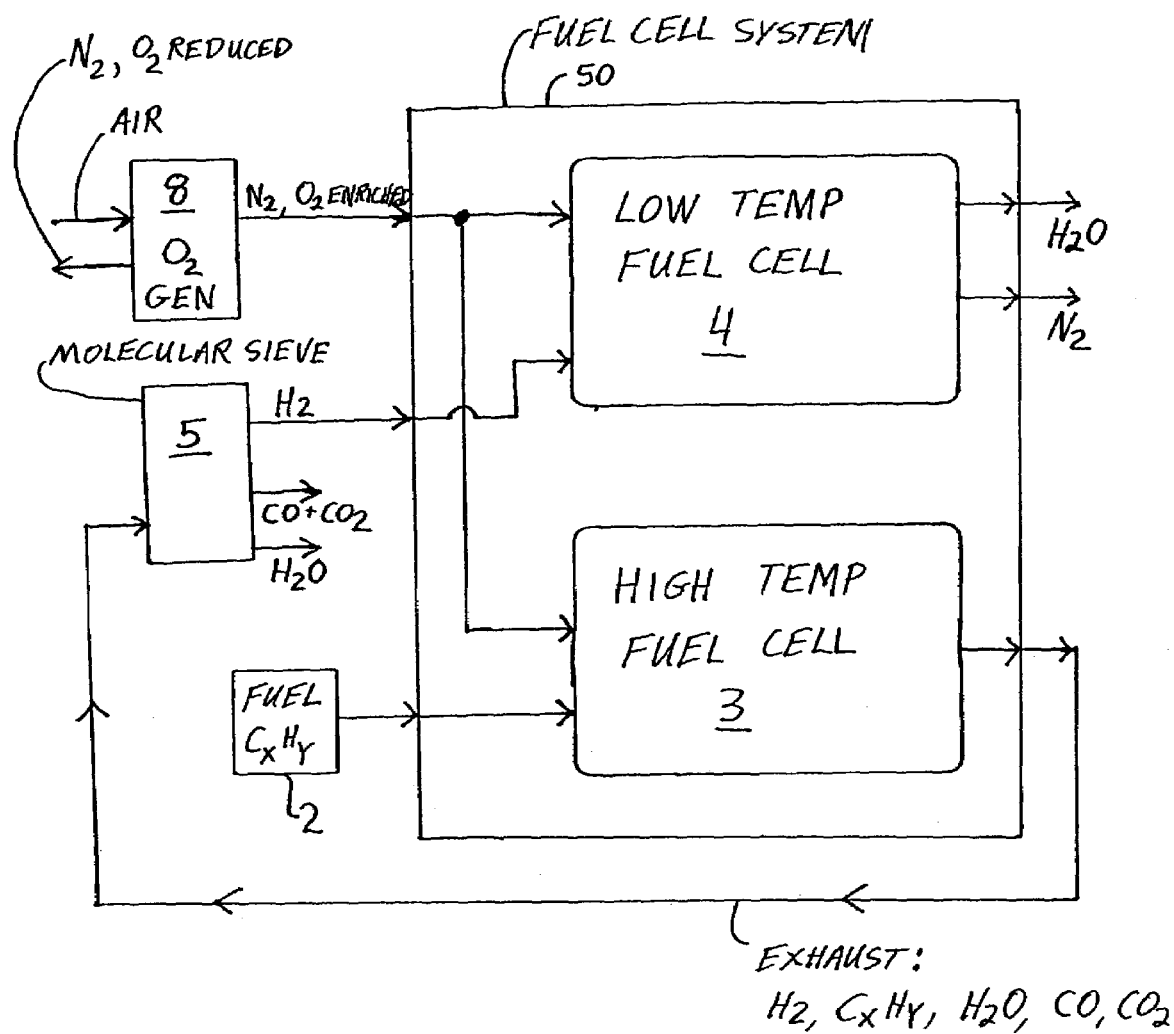
FIG. 1 is a generalized and simplified schematic block diagram of the major components of a first embodiment of the inventive fuel cell arrangement for carrying out a first embodiment of the inventive method.

FIG. 1 is a greatly simplified schematic block diagram showing the major components and connections of a fuel cell arrangement according to a first embodiment of the invention. Only the principle inputs and outputs of each block are shown, while many inputs and outputs have been omitted for simplicity in explaining the principle features, functions and operation of the arrangement.

This embodiment of the fuel cell arrangement shown in FIG. 1 includes a fuel cell system 50, an oxygen enrichment device or oxygen generator 8, a molecular sieve 5, and a hydrocarbon fuel supply 2, for example supplying kerosene or jet fuel. The fuel cell system 50 includes a low temperature fuel cell 4 (e.g. PEMFC), as well as a high temperature fuel cell 3 (e.g. SOFC). The oxygen generator 8 receives an input of environmental air, and provides an output of oxygen enriched air or gas, predominantly comprising nitrogen ($N_2$) and an enriched proportion of oxygen ($O_2$) in comparison to the input air. The oxygen generator further produces an exhaust output based on air with a reduced oxygen content. The oxygen enriched output gas is provided to the fuel cell system 50 as an input, particularly as an input to both the low temperature and high temperature fuel cells 4, 3.

The high temperature fuel cell 3 further receives a fuel input of hydrocarbon fuel from the fuel supply 2, and carries out its electrochemical conversion process, while producing electricity and an exhaust output of exhaust gases including hydrogen ($H_2$), hydrocarbons ($C_xH_y$), water vapor ($H_2O$), carbon monoxide (CO), carbon dioxide ($CO_2$) and other gas components. This exhaust gas, or at least a portion thereof, is introduced as an input to the molecular sieve 5, which selectively separates the hydrogen content thereof to provide a hydrogen gas or hydrogen enriched gas output, which in turn is provided as a fuel input to the low temperature fuel cell 4. The molecular sieve 5 further provides an output gas of carbon monoxide and carbon dioxide, as well as an output of useable water. The low temperature fuel cell 4 carries out its electrochemical process using the oxygen enriched gas and the hydrogen enriched gas, and produces electricity, an output of nitrogen gas ($N_2$) and an output of useable water ($H_2O$).

Further according to the invention, in comparison to the embodiment of FIG. 1, the high temperature fuel cell 3 is optional in the fuel cell system 50. In other words, the fuel cell system 50 can comprise only the low temperature fuel cell 4 without the high temperature fuel cell 3. The molecular sieve 5 is also optional. Most basically, the arrangement thus includes the oxygen generator 8 to supply oxygen enriched gas to the low temperature fuel cell 4 of the fuel cell system 50. Further, the basic system may include the molecular sieve 5 providing a hydrogen enriched gas to the low temperature fuel cell, whereby the molecular sieve 5 may, for example, use a flow of air as its input to selectively separate the hydrogen enriched gas flow therefrom. Preferably though, as shown in FIG. 1, the molecular sieve receives an exhaust gas flow from the high temperature fuel cell 3, or from a hydrocarbon reformer.

Figure 2:
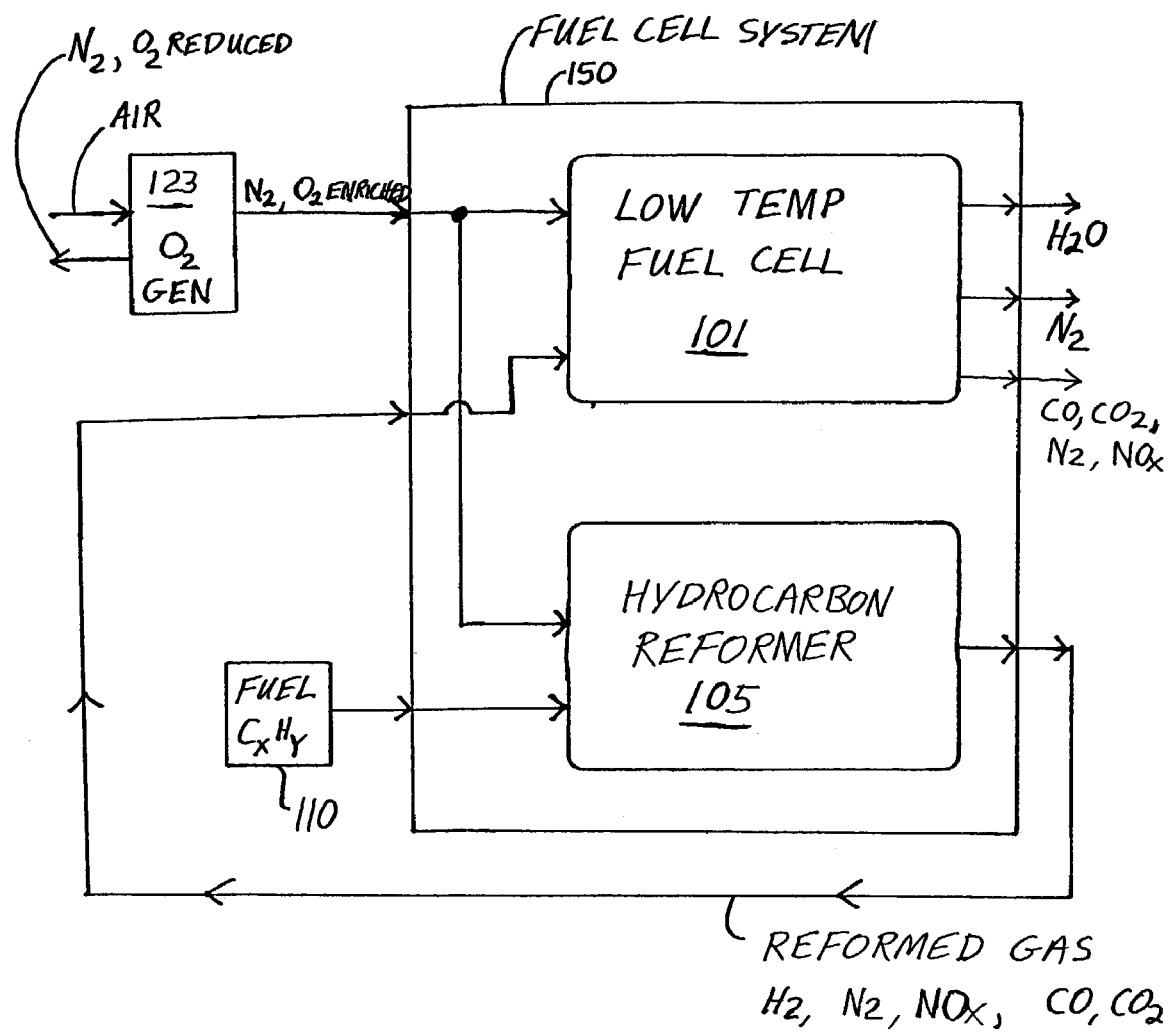
FIG. 2 is a generalized and simplified schematic block diagram of a second embodiment of a fuel cell arrangement according to the invention for carrying out a second embodiment of the inventive method.

FIG. 2 shows a further variation of the basic system, which omits the molecular sieve 5 and the high temperature fuel cell 3. Instead, the fuel cell system 150 includes a low temperature fuel cell 101 and a hydrocarbon fuel reformer 105. The reformer 105 receives oxygen enriched air from the oxygen generator 123, as well as a hydrocarbon fuel ($C_XH_Y$) from a fuel supply 110. The reformer 105 carries out a reforming process to convert or reform the input components $C_XH_Y+H_2O+O_2+H_2O+O_2+N_2$ to the output components $H_2+CO+CO_2+H_2O+N_2+NO_X$. The reformed output or exhaust gas from the reforming process 105, containing $H_2$, CO, $CO_2$, $N_2$ and $NO_X$ (from which water and hydrocarbons have preferably been condensed out and returned to the reforming process) is supplied as a fuel input to the low temperature fuel cell 101. The low temperature fuel cell 101 further receives an input of oxygen enriched air or gas from the oxygen generator 123, to carry out the electrochemical fuel cell process, from which the output includes water, nitrogen, and an exhaust gas of the remaining components.

Now that the basic arrangement and operation of different embodiments of the invention have been described, further details relating to the oxygen enrichment, the fuel enrichment, and a particular application as a water generating system will be discussed. Then, particular detailed embodiments of the invention will be further described in connection with FIGS. 3 and 4.

Various different devices and processes can be used for carrying out the oxygen enrichment for the invention, particularly in the oxygen enrichment device or oxygen generator 8, 123. Generally, a gas with a geometrically smaller molecular size can be separated from larger molecules of other gases through a so-called molecular sieve. In the present case, the molecules of oxygen are geometrically smaller than molecules of nitrogen and carbon dioxide in atmospheric air, so that the oxygen molecules can permeate through a molecular sieve, while the nitrogen and carbon dioxide molecules are held back and not allowed to permeate through the molecular sieve. Thus, on the opposite or downstream side of the sieve, an oxygen enriched gas flow is produced as an output, while an oxygen reduced or oxygen depleted gas is removed as a byproduct on the upstream side of the molecular sieve. Any other conventionally known devices and processes for achieving an oxygen enrichment from an input air or gas flow could alternatively be used. For example, processes based on porous ceramics, or using the influence of electrostatic charges, could also be used in the oxygen generator 8, 123.

More particularly, on the supply side, the system is provided with a pressurized input of atmospheric air, which forcefully presses the air through the oxygen enrichment device, for example a molecular sieve, in the oxygen generator 8, 123. Thereby, nitrogen and carbon dioxide molecules are retained or held back, while the oxygen enriched air at the downstream output of the enrichment system is directly provided to the fuel cell system 50, 150. In the fuel cell 3, 4, 101 itself, the oxygen of the oxygen enriched input gas is combined with hydrogen atoms to form water ($H_2O$). This water is condensed or separated and can then be provided for other uses, for example as supply water for an onboard water system in an aircraft, or for water as an input to a fuel reforming process (as will be described in detail below). The quantity flow of oxygen through the fuel cell is greater than the actual oxygen consumption, so that not all of the supplied oxygen content of the input gas will be utilized in the fuel cell. The remaining or excess oxygen is thus preferably returned to the input side of the oxygen enrichment system to further increase the oxygen enriching capability. The pressurization, or supply of compressed air to the oxygen enrichment system and the fuel cell system is achieved by a compressor, which may be driven by an electric motor powered by electrical energy produced by the fuel cell or cells, or may be driven by mechanical energy provided by an exhaust gas turbine powered by the exhaust gas output of a high temperature fuel cell.

Now regarding the fuel enrichment, there are distinctions that will be discussed separately in connection with the fuel enrichment for a high temperature fuel cell versus the fuel enrichment for a low temperature fuel cell. Particularly, the starting fuel as a basic input is preferably a hydrocarbon liquid fuel, such as kerosene or jet fuel. In both cases, namely for both the high temperature and low temperature fuel cells, hydrogen is obtained by splitting or cracking hydrocarbon and water molecules in a reforming process (e.g. 105). This fuel reforming process 105 produces as an output not only atomic and molecular hydrogen, but also various other reaction gases, which are not used in the operation of the fuel cell.

If the fuel cell system includes a high temperature fuel cell, in which the reforming process is carried out internally, i.e. the hydrogen enrichment occurs internally within the high temperature fuel cell itself, then a separate external reformer is not needed upstream of the low temperature fuel cell, which will receive the reformed output exhaust gas of the high temperature fuel cell. Alternatively, an external separate reformer can be provided upstream of the low temperature fuel cell, to receive a separate reformed fuel input, separately from the reforming process that takes place internally in the high temperature fuel cell. The internal reforming process that generally takes place within a high temperature fuel cell is not taken into consideration in this context, because it is typical of the high temperature fuel cell process.

Low temperature fuel cells are generally extremely sensitive to impurities or contamination of the fuel gas, so that a prior enrichment of the fuel gas with hydrogen, and therewith a proportional or percentage-wise reduction of the impurities or contamination, is recommended and preferred. According to the invention, for this purpose, the reaction gases produced in a reformer are separated and thereby purified and enriched through a molecular sieve (e.g. 5). The resulting output products of the reforming process include hydrocarbons ($C_XH_Y$) and water ($H_2O$), as well as the reaction gases hydrogen ($H_2$), carbon monoxide (CO), carbon dioxide ($CO_2$), and water vapor ($H_2O$). Among these output components, the hydrogen is the useable gas for the low temperature fuel cell (for example PEMFC 4, 101).

In a manner analogous to the operation of a molecular sieve discussed above in connection with the oxygen enrichment, the hydrogen is separated in a molecular sieve 5, and is thereby enriched to provide an input to the upstream side of the anode side membrane of the fuel cell 4, 101. The other gases that are separated by the molecular sieve 5, such as hydrocarbon gases, water vapor, etc., can be at least partially supplied back into the reforming process, e.g. into the high temperature fuel cell 3 or back into the reformer 105, in order to be again subjected to splitting or cracking in the reforming process, to again provide hydrogen which can be delivered to the low temperature fuel cell, before the remaining gases are emitted as exhaust.

A particular advantageous and preferred application of the inventive system and method is in a fuel cell based power and water generating system, that can preferably be used in a mobile vehicle, such as in an aircraft. The water to be produced shall have the highest possible degree of purity and especially should be free of hydrocarbons, alcohols, etc., as well as other potentially health-endangering components.

In high temperature fuel cells, the useable water arises on the anode side of the fuel cell, i.e. on the side to which the fuel is supplied. When using hydrocarbons as the combustible fuel gas, the condensation of water vapor from the fuel cell exhaust gas results in a mixture of water and hydrocarbon molecules, and possibly also soot particles and other health-endangering components. On the other hand, in the operation of a low temperature fuel cell, the water is generated on the oxygen or air input side of the cell, and therefore the resulting water innately has a much higher degree of purity. However, a high temperature fuel cell generally achieves a higher efficiency than a low temperature fuel cell, so that in mobile applications, for example for use in an aircraft, it is desirable to use a high temperature fuel cell system, for example based on a solid oxide fuel cell such as a ceramic oxide fuel cell combined with a gas turbine (SOFC+GT) for reasons of efficiency.

Through the reforming process that takes place internally in the operation of the high temperature fuel cell, sufficient hydrogen can be split or cracked from the input fuel in order to supply the needs of the high temperature fuel cell itself, as well as the needs of an additional low temperature fuel cell connected in gas-flow series, as described herein. According to the invention, the process of fuel enrichment, and particularly hydrogen enrichment, is interposed between the fuel input side of the high temperature fuel cell and the fuel input side (i.e. the hydrogen side) of the low temperature fuel cell. Particularly, the hydrogen enrichment can be achieved directly in the high temperature fuel cell 3 or by the molecular sieve 5 interposed between the exhaust output of the high temperature fuel cell 3 or of the reformer 105, and the fuel input of the low temperature fuel cell 4, 101. Since the low temperature fuel cell, and particularly the membrane thereof, is sensitive to thermal loading, the input combustible fuel gas (hydrogen) must be cooled (preferably to below 80° C.) somewhere in the path between the output of the high temperature fuel cell or the reformer and the input of the low temperature fuel cell. For this purpose, an expansion turbine with a following cooler or cooling heat exchanger (e.g. cooled with outside ambient air) can be used, for example. The same cooling is preferably also applied to the air or the oxygen enriched gas provided to the low temperature fuel cell.

Figure 3:
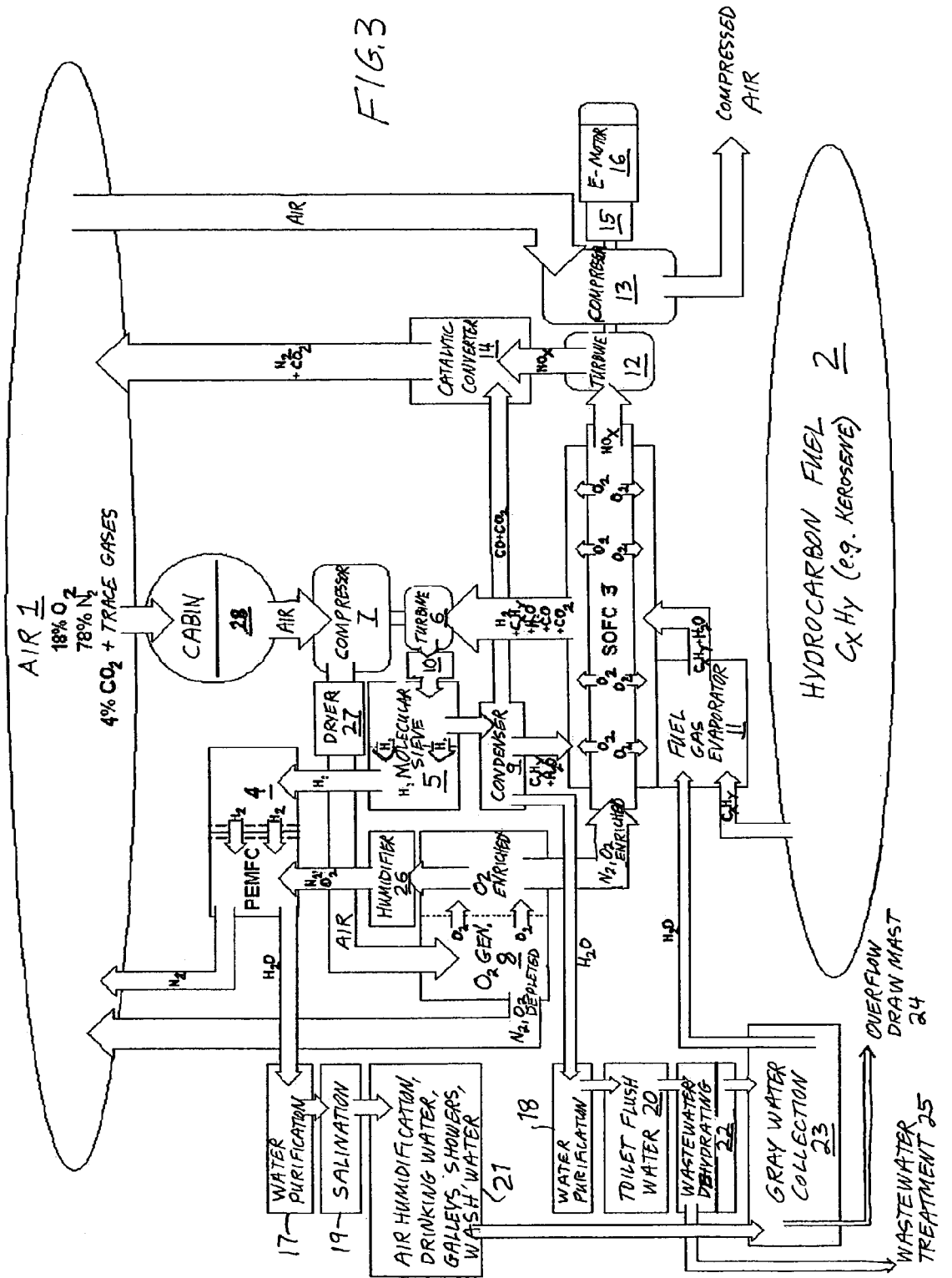
FIG. 3 is a detailed schematic block diagram of a combined fuel cell system generally according to FIG. 1, including a PEMFC low temperature fuel cell and a SOFC high temperature fuel cell, with both oxygen and hydrogen enrichment, for generating electrical power and useable water, especially onboard an aircraft.

In view of the preceding general discussion, FIG. 3 now shows a more detailed process and arrangement in a schematic diagram generally according to the embodiment of FIG. 1.

As shown in FIG. 3, the fuel cell system includes a low temperature fuel cell (PEMFC) 4 and a high temperature fuel cell (SOFC) 3, in combination with a molecular sieve 5 and an oxygen generator 8. Environmental air 1 is delivered as compressed or pressurized air to a passenger cabin 28 of an aircraft. The used or exhaust air from the cabin 28 is provided to a compressor 7 which further compresses this environmental air, and passes it through an air drier 27 to the air input of the oxygen generator 8. The selectively permeable membrane of the oxygen generator 8 allows oxygen to selectively permeate therethrough, while holding back other components of the air. Thus, an exhaust flow of oxygen depleted or oxygen reduced air is returned back to the environment, i.e. the environmental air 1 outside of the aircraft. On the other hand, a portion of the oxygen enriched air or gas on the output side of the oxygen generator 8 is delivered through a humidifier 26 to the oxidizer input of the low temperature fuel cell 4. Another portion of the oxygen enriched gas is provided to the oxidizer input of the high temperature fuel cell 3.

The high temperature fuel cell 3 further receives its fuel input from a fuel preparation evaporator 11. Particularly, an input flow of water is provided from a gray water collection tank 23, and an input flow of liquid hydrocarbon fuel 2 such as kerosene or jet fuel are provided to the evaporator 11, which vaporizes or gasifies the liquid inputs and supplies the resulting gaseous fuel ($C_xH_y+H_2O$) to the fuel input of the high temperature fuel cell 3. Through the electrochemical process carried out in the fuel cell 3, electrical energy is produced, and two output or exhaust gas flows are produced.

First, an exhaust flow of nitrogen oxides ($NO_x$) is expanded through a turbine 12 and then provided to a catalyst in a catalyzer or catalytic converter 14, which also receives a flow of carbon monoxide and carbon dioxide as will be described below. The catalytic conversion reaction that takes place in the catalytic converter 14 results in an output exhaust gas of nitrogen and carbon dioxide ($N_2+CO_2$), which is exhausted to the atmospheric air 1. Meanwhile, the expansion turbine 12 drives a compressor 13 which may, for example, compress atmospheric air 1 to provide pressurized air for any required onboard uses (for example pressurized cabin air). The compressor 13, or rather the shaft of the turbine 12 and compressor 13, may be further connected, e.g. through a transmission or the like 15, to an electric motor and/or generator, depending on the energy balance requirements.

The second exhaust gas output from the high temperature fuel cell 3 is the main exhaust including hydrogen, hydrocarbons, water vapor, carbon monoxide, and carbon dioxide, which is provided through an expansion turbine 6 and then through a cooling heat exchanger 10 to the input of the molecular sieve 5. The turbine 6 drives the above mentioned compressor 7 for compressing the input air to the oxygen generator 8 as described above. In the molecular sieve 5, the input gases are separated, to provide a hydrogen gas flow or hydrogen enriched gas flow which is supplied to the fuel input of the low temperature fuel cell 4, as well as a residual gas output that flows to a condenser 9. In the condenser 9, hydrocarbons are condensed out and returned back into the high temperature fuel cell 3. Also in the condenser 9, water is condensed out to form useable liquid water.

The useable water is provided to a purification system 18, where the water is purified and then supplied for non-potable uses such as toilet flushing 20 and the like. Since this water originated from the hydrocarbon fuel in the exhaust of the high temperature fuel cell, it initially is quite impure as discussed above. For this reason, this water is preferably not used as potable drinking water, but rather only for non-drinking demands such as toilet flushing 20. The resulting wastewater from the toilets is subjected to a wastewater separating and waste dehydrating step 22, from which the dehydrated waste and/or black wastewater can then be removed and subjected to a wastewater treatment process. The remaining gray water is provided into the gray water collection tank 23. Any excess amount of gray water that overflows the gray water collection tank 23 is drained through an overflow 24 such as a drain mast of the aircraft. As mentioned above, some of this gray water is also fed back to the fuel evaporator 11 that supplies the input fuel gas to the high temperature fuel cell 3.

The non-condensing gaseous components from the condenser 9 are predominantly carbon monoxide and carbon dioxide, which are supplied to the catalyzer or catalytic converter 14 as discussed above.

In the low temperature fuel cell 4, the electrochemical fuel cell process is carried out with the input hydrogen enriched fuel gas and the input oxygen enriched oxidizer gas, to produce electrical energy, as well as an output gas of nitrogen that is returned to the atmospheric air 1, and a water output that is provided to a purification stage 17. Then, to make the highly purified water suitable for potable uses, and especially suitable as drinking water, it is subjected to a salination step 19, where potably appropriate (small) amounts of salts and/or minerals are added to the water. This treated water is then provided to uses such as humidification of the air in the air conditioning system, drinking water for the passengers, water for the galleys, and showering and washing water in the passenger restroom facilities, or in various other potable water consumption steps 21. The resulting used water is delivered to the gray water collection tank 23. Note that the potable water produced by the low temperature fuel cell is first intermediately stored separately from the non-potable water produced by the high temperature fuel cell, and that the water levels of the two types of water may be detected, monitored and controlled by a control unit (not shown) according to any conventionally known water system teachings.

The overall water and power generation system and method represented by FIG. 3 is self-contained (except for inputs of air and hydrocarbon fuel), highly efficient, and environmentally friendly (i.e. returning essentially only environmentally friendly gases back to the atmosphere), and provides electrical and mechanical power, highly purified water suitable for potable uses, and less-pure water suitable for gray water uses.

Figure 4:
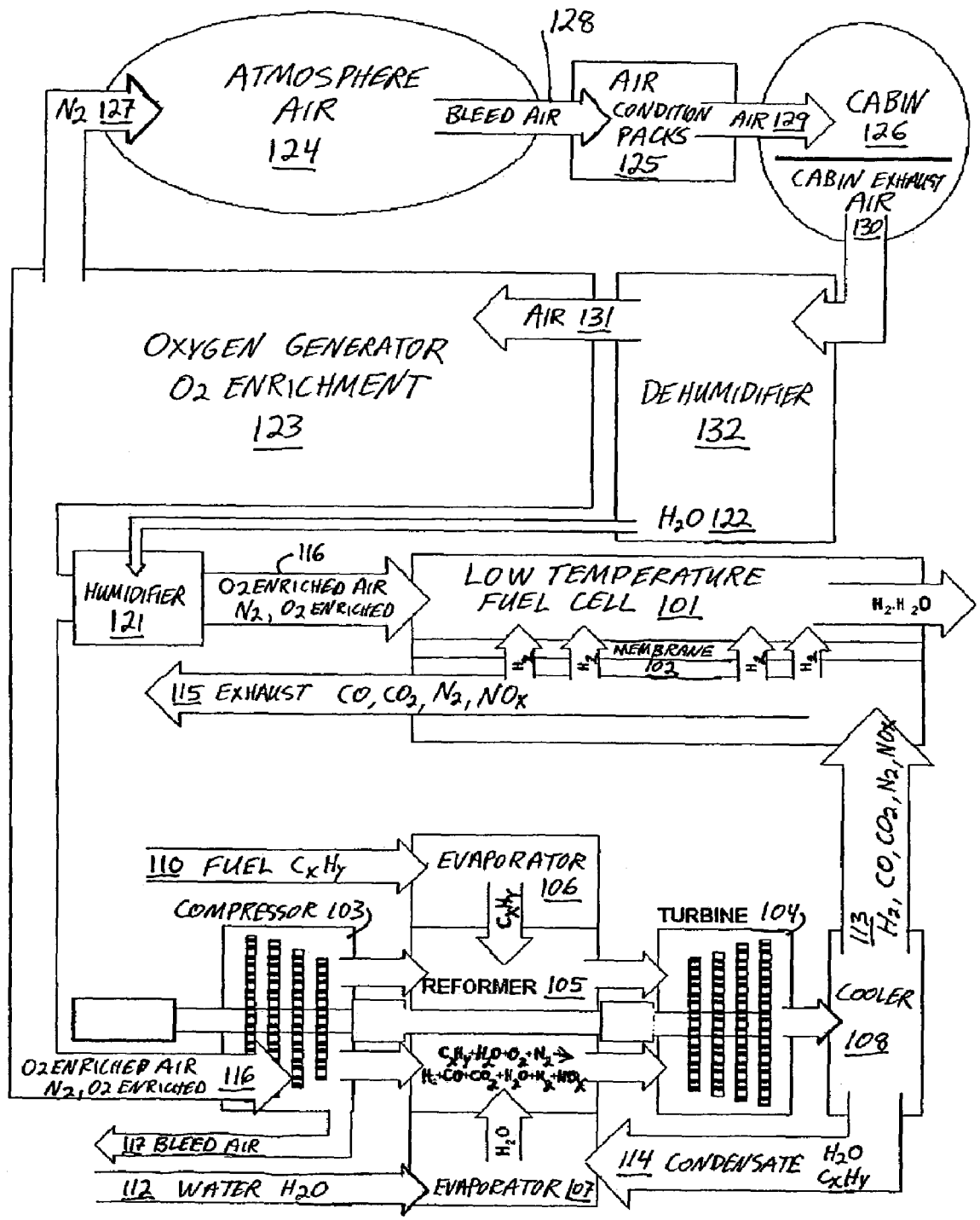
FIG. 4 is a detailed schematic block diagram of a fuel cell system generally according to FIG. 2, including a low temperature fuel cell with oxygen enrichment and hydrocarbon fuel reforming, especially for use in an aircraft.

Now referring to FIG. 4, this schematic block diagram represents a detailed system generally according to the arrangement of FIG. 2 discussed above. Namely, this system and process includes a low temperature fuel cell 101, a fuel reformer 105, and an oxygen generator 123.

Atmospheric air 124 is compressed in the compressor stages of the engines of the aircraft to provide engine bleed air 128 to the air conditioning packs 125, which in turn provide conditioned air 129 into a passenger cabin 126 of the aircraft. The cabin exhaust air 130 is delivered through a dehumidifier 132 to provide dry air 131 into the oxygen generator or oxygen enrichment device 123. In turn, the oxygen generator 123 outputs a flow of nitrogen enriched or oxygen depleted air 127 back to the atmosphere 124, as well as a flow of oxygen enriched air 116.

One portion of the oxygen enriched air 116 is provided through a humidifier 121, which receives water 122 from the dehumidifier 132 mentioned above. The humidified oxygen enriched air 116 is then provided as the oxidizer gas input to the low temperature fuel cell 101.

A second portion of the oxygen enriched air 116 is provided to a compressor 103, which compresses the air and supplies it into the reformer 105. A liquid hydrocarbon fuel 110 is provided to a fuel vaporizer or evaporator 107 which then delivers the evaporated gaseous hydrocarbon fuel into the reformer 105. Also, liquid water 112 is provided to an evaporator 107, which in turn supplies the resulting water vapor into the reformer 105. The reformer 105 then carries out a hydrocarbon reforming process on the input fuel, water vapor, and oxygen enriched air, to convert the input $C_XH_Y + H_2O + O_2 + N_2$ to the output $H_2 + CO + CO_2 + H_2O + N_2 + NO_X$. The output gas is expanded through a turbine 104 and then delivered to a cooler or cooling heat exchanger 108. Through this cooling, water and hydrocarbons condense out, and are then fed back to the water evaporator 107. On the other hand, the cooled, dried reformed output gas 113 containing $H_2$, CO, $CO_2$, $N_2$ and $NO_X$ is supplied to the fuel input of the low temperature fuel cell 101. Preferably, the cooled reformed gas 113 is supplied through a gas buffer (not shown separately) for temporarily storing and buffering the supply quantity of the gas just upstream from the fuel cell 101. This gas buffer can be integrated or incorporated into the fuel cell itself.

In the fuel cell 101, the hydrogen from the input fuel gas 113 is processed through the fuel cell membrane 102, with the oxidizer, to thereby produce electrical energy, as well as an output gas flow of nitrogen and water vapor. The remaining exhaust gas 115 emitted by the low temperature fuel cell 101 contains CO, $CO_2$, $N_2$ and $NO_X$, which may then be exhausted to the atmosphere or further processed, for example to reduce the $NO_X$ emissions (for example using a catalytic converter as discussed above in connection with FIG. 3). The nitrogen and water vapor output of the low temperature fuel cell can be condensed and purified and further treated, similarly as described above in connection with FIG. 3, for onboard uses.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. A fuel cell arrangement comprising:
a fuel cell system including an oxidizer inlet, a first fuel inlet, a high temperature fuel cell, and a low temperature fuel cell, wherein said high temperature fuel cell has an oxidizer inlet, a fuel inlet, an exhaust outlet and a nitrogen oxide outlet, and wherein said low temperature fuel cell has an oxidizer inlet;
an oxygen generator having an air inlet that is adapted to receive air, and an outlet that is adapted to provide an oxygen-enriched output gas and that is connected to said oxidizer inlet of said fuel cell system, which connects to at least said oxidizer inlet of said high temperature fuel cell and said oxidizer inlet of said low temperature fuel cell;
a hydrocarbon fuel supply that is adapted to supply a hydrocarbon fuel and that is connected to said first fuel inlet of said fuel cell system, which connects to said fuel inlet of said high temperature fuel cell; and
a catalytic converter connected to said nitrogen oxide outlet of said high temperature fuel cell.

2. A fuel cell arrangement comprising:
a fuel cell system including an oxidizer inlet, a first fuel inlet, a second fuel inlet, a high temperature fuel cell, and a low temperature fuel cell, wherein said high temperature fuel cell has an oxidizer inlet, a fuel inlet, and an exhaust outlet, and wherein said low temperature fuel cell has a fuel inlet and an oxidizer inlet;
an oxygen generator having an air inlet that is adapted to receive air, and an outlet that is adapted to provide an oxygen-enriched output gas and that is connected to said oxidizer inlet of said fuel cell system, which connects to at least said oxidizer inlet of said high temperature fuel cell and said oxidizer inlet of said low temperature fuel cell;
a hydrocarbon fuel supply that is adapted to supply a hydrocarbon fuel and that is connected to said first fuel inlet of said fuel cell system, which connects to said fuel inlet of said high temperature fuel cell;

a molecular sieve having an inlet connected to said exhaust outlet of said high temperature fuel cell, and a first sieve outlet that is adapted to provide a selectively hydrogen-enriched output gas and that is connected to said second fuel inlet of said fuel cell system, which is connected to said fuel inlet of said low temperature fuel cell;

a condenser connected to a second sieve outlet of said molecular sieve that is adapted to provide a hydrogen-reduced output gas to said condenser, wherein said condenser has a condenser water outlet that is adapted to output non-potable water, a condenser hydrocarbon outlet that is adapted to output hydrocarbons and that is connected to said high temperature fuel cell, and a gas outlet that is adapted to output carbon monoxide gas and carbon dioxide gas; and a catalytic converter connected to said gas outlet of said condenser and to a nitrogen oxide outlet of said high temperature fuel cell.

3. The fuel cell arrangement according to claim 2, further comprising an expansion turbine interposed between said exhaust outlet of said high temperature fuel cell and said inlet of said molecular sieve, and a compressor mechanically connected to said expansion turbine and airflow-connected to said air inlet of said oxygen generator.

4. The fuel cell arrangement according to claim 3, further comprising a cooling heat exchanger interposed between said expansion turbine and said inlet of said molecular sieve.

5. The fuel cell arrangement according to claim 1, in combination with an aircraft having a pressurized cabin, wherein a cabin exhaust air outlet of said cabin is connected to said air inlet of said oxygen generator.

6. The fuel cell arrangement according to claim 1, further comprising a water purification and treatment system having an inlet connected to a byproduct water outlet of said low temperature fuel cell, and a potable water outlet that is adapted to provide potable water.

7. The fuel cell arrangement according to claim 1, wherein said fuel cell system further includes a hydrocarbon fuel reformer having an oxidizer inlet connected to said oxidizer inlet of said fuel cell system and thereby to said outlet of said oxygen generator, a fuel inlet connected to said first fuel inlet of said fuel cell system and thereby to said hydrocarbon fuel supply, and a reformed gas outlet connected to a fuel inlet of said low temperature fuel cell.

8. A fuel cell arrangement comprising:

a fuel cell system including an oxidizer inlet, a first fuel inlet, a hydrocarbon fuel reformer, and a low temperature fuel cell, wherein said low temperature fuel cell has an oxidizer inlet and a fuel inlet, and said hydrocarbon fuel reformer has an oxidizer inlet, a fuel inlet and a reformed gas outlet connected to said fuel inlet of said low temperature fuel cell;

an oxygen generator having an air inlet that is adapted to receive air, and an outlet that is adapted to provide an oxygen-enriched output gas and that is connected to said oxidizer inlet of said fuel cell system, which connects to at least said oxidizer inlet of said hydrocarbon fuel reformer and said oxidizer inlet of said low temperature fuel cell;

a hydrocarbon fuel supply that is adapted to supply a hydrocarbon fuel and that is connected to said first fuel inlet of said fuel cell system, which connects to said fuel inlet of said hydrocarbon fuel reformer; and an expansion turbine interposed between said reformed gas outlet and said fuel inlet of said low temperature fuel cell.

9. The fuel cell arrangement according to claim 8, further comprising a compressor mechanically connected to said expansion turbine and interposed between said outlet of said oxygen generator and said oxidizer inlet of said hydrocarbon fuel reformer.

10. The fuel cell arrangement according to claim 8, further comprising a cooling heat exchanger interposed between said expansion turbine and said fuel inlet of said low temperature fuel cell.

11. The fuel cell arrangement according to claim 10, wherein said heat exchanger has a condensate outlet that is adapted to provide at least non-potable water and that is connected to a condensate inlet of said hydrocarbon fuel reformer.

12. The fuel cell arrangement according to claim 7, further comprising a water purification and treatment system having an inlet connected to a byproduct water outlet of said low temperature fuel cell, and a potable water outlet that is adapted to provide potable water.

13. The fuel cell arrangement according to claim 7, further comprising a catalytic converter connected to an exhaust gas outlet of said low temperature fuel cell.

14. A method of operating the fuel cell arrangement according to claim 1, said method comprising the steps:

a) in an oxygen enrichment process carried out in said oxygen generator, selectively increasing an oxygen content of said air received at said air inlet to prepare said oxygen-enriched output gas provided at said outlet of said oxygen generator;

b) supplying said hydrocarbon fuel as a hydrocarbon fuel gas from said hydrocarbon fuel supply to said first fuel inlet of said fuel cell system;

c) in a fuel gas separation and enrichment process including a hydrocarbon reforming process, selectively separating a hydrogen component of said hydrocarbon fuel gas to prepare therewith a hydrogen-enriched fuel gas, condensing water and a hydrocarbon component out of said hydrocarbon fuel gas, and selectively separating carbon monoxide and carbon dioxide from said hydrocarbon fuel gas;

d) providing said oxygen-enriched gas to said oxidizer inlet on a cathode side of said low temperature fuel cell, providing said hydrogen-enriched fuel gas to a fuel inlet on an anode side of said low temperature fuel cell, and carrying out an electrochemical fuel cell reaction in said low temperature fuel cell; and e) feeding said water and said hydrocarbon component back into said hydrocarbon reforming process.

15. The method according to claim 14, wherein said step d) further comprises producing electrical power and useable water as a result of said electrochemical fuel cell reaction in said low temperature fuel cell.

16. The method according to claim 14, further comprising catalytically converting said carbon monoxide and said carbon dioxide to reduce or eliminate said carbon monoxide in a resultant converted gas, and emitting said converted gas to the atmosphere.

17. The method according to claim 16, wherein said hydrocarbon reforming process is carried out in a fuel cell process in said high temperature fuel cell, and wherein said method further comprises catalytically converting a nitrogen oxide exhaust component of said fuel cell process together with said catalytic converting of said carbon monoxide and said carbon dioxide to convert said carbon monoxide, said carbon dioxide and said nitrogen oxide exhaust component into carbon dioxide and molecular nitrogen, which make up said resultant converted gas.

18. The method according to claim 14, wherein said hydrocarbon reforming process is carried out in a fuel cell process in said high temperature fuel cell.

19. The method according to claim 18, wherein said hydrogen component in said hydrocarbon fuel gas is obtained from a raw hydrocarbon fuel by carrying out said hydrocarbon reforming process in said fuel cell process in said high temperature fuel cell.

20. The method according to claim 19, further comprising cooling said hydrogen-enriched fuel gas to a temperature below 80° C., and wherein said fuel gas separation and enrichment process additionally includes further enriching a content of said hydrogen component in said hydrogen-enriched fuel gas using a molecular sieve after said cooling and before said step d).

21. The method according to claim 20, wherein said cooling comprises expanding said hydrogen-enriched fuel gas through an expansion turbine.

22. The method according to claim 21, wherein said cooling further comprises passing said hydrogen-enriched fuel gas through a heat exchanger after said expanding.

23. The method according to claim 20, further comprising cooling said oxygen-enriched gas to a temperature below 80° C. before said step d).

24. The method according to claim 23, wherein said cooling of said oxygen-enriched gas comprises expanding said oxygen-enriched gas through an expansion turbine.

25. The method according to claim 24, wherein said cooling of said oxygen-enriched gas further comprises passing said oxygen-enriched gas through a heat exchanger after said expanding.

26. The method according to claim 18, further comprising recovering water from at least one of an anode side of said high temperature fuel cell and said cathode side of said low temperature fuel cell.

27. The method according to claim 26, further comprising processing said water recovered from said low temperature fuel cell to prepare potable water, and processing said water recovered from said high temperature fuel cell to prepare non-potable water for non-potable use.

28. The method according to claim 26, further comprising using said water recovered from said low temperature fuel cell for humidifying conditioned air in an air conditioning plant.

29. The method according to claim 26, further comprising recovering and storing said water recovered from said low temperature fuel cell and said water recovered from said high temperature fuel cell respectively separately from one another as separately stored waters.

30. The method according to claim 29, further comprising detecting respective stored water levels of said separately stored waters using a control unit.

31. The method according to claim 14, further comprising providing gray wastewater, supplying at least a portion of said gray wastewater as an input to said hydrocarbon reforming process, and draining an excess of said gray wastewater.

32. The method according to claim 14, further comprising providing black wastewater, cleaning and partially dehydrating waste components of said black wastewater to prepare processed wastewater, supplying at least a portion of said processed wastewater as an input to said hydrocarbon reforming process, and draining an excess of said processed wastewater.

33. The method according to claim 14, further comprising providing pressurized cabin exhaust air from a pressurized aircraft cabin as said air.

34. The method according to claim 14, wherein said air is pressurized and applied under pressure to a cathode side of said fuel cell system.

35. The method according to claim 14, wherein said air is pressurized and applied under pressure to an anode side of said fuel cell system.

36. The fuel cell arrangement according to claim 1, wherein said oxygen generator comprises a selectively permeable membrane that allows oxygen to selectively permeate therethrough.

37. The fuel cell arrangement according to claim 1, wherein said hydrocarbon fuel supply is a jet fuel supply adapted to supply a jet fuel as said hydrocarbon fuel.

* * * * *